F. W. UNGER.
VEHICLE JACK.
APPLICATION FILED OCT. 18, 1910.

1,032,453.

Patented July 16, 1912.

UNITED STATES PATENT OFFICE.

FREDERIC WM. UNGER, OF LEESPORT, PENNSYLVANIA, ASSIGNOR, BY MESNE ASSIGNMENTS, TO ELLEN D. UNGER, OF LEESPORT, PENNSYLVANIA.

VEHICLE-JACK.

1,032,453.  Specification of Letters Patent.  Patented July 16, 1912.

Application filed October 18, 1910. Serial No. 587,636.

*To all whom it may concern:*

Be it known that I, FREDERIC W. UNGER, a citizen of the United States, and a resident of Leesport, in the county of Berks and State of Pennsylvania, have invented certain new and useful Improvements in Vehicle-Jacks, of which the following is a specification.

My invention relates to an improved mechanism adapted more particularly for raising automobiles so as to relieve the rubber tires of the objectionable weight of the vehicle thereon when not in service; and my object is to provide a simple and easily operated mechanism for such purpose.

Heretofore vehicle jacks having pivoted front and rear lifting arms have been commonly provided with horizontal connections between said arms through which their joint operation is effected.

My invention provides for dispensing with such connections so as to not only greatly simplify the construction and prevent contact with depending parts of the vehicle, but to permit of independently swinging the disconnected front and rear arms to the most convenient operative and inoperative positions.

The invention is fully described in connection with the accompanying drawing illustrating an at present preferred embodiment thereof, and the novel features are specifically pointed out in the claims.

Figure 1:
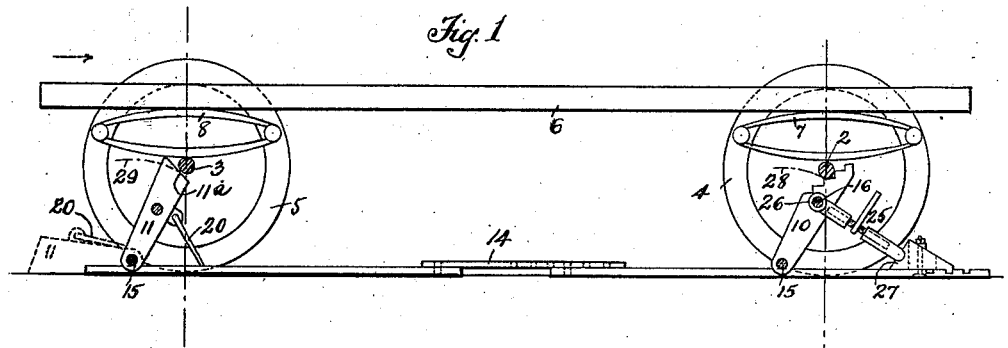
Figure 2:
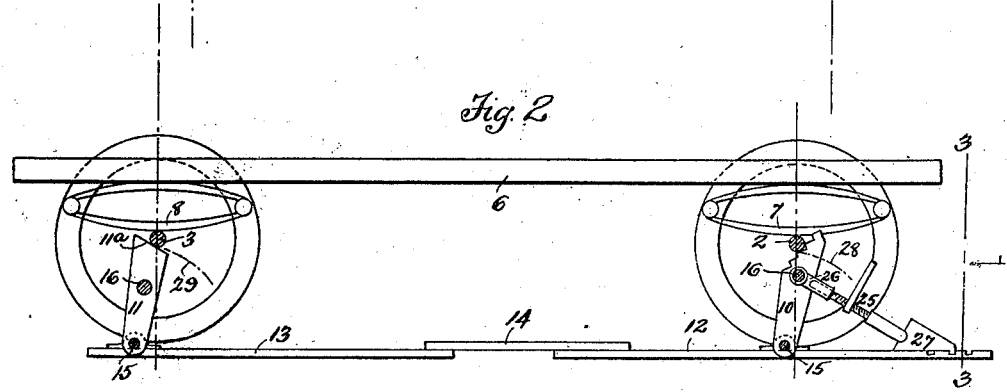
Figure 3:
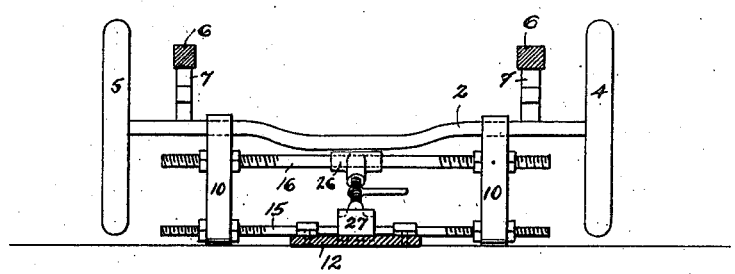

Figure 1 is a longitudinal section of my improved device showing the front and rear radius arms set for lifting a vehicle which is placed in proper relative position; the independent swinging of the respective arms to folded-down position being indicated in dotted lines. Fig. 2 is a similar view to Fig. 1 showing the radius arm lifts in vehicle elevating positions. Fig. 3 is an end view of the apparatus looking in the direction of the arrow, Fig. 2.

The drawings show my invention in connection with certain parts of a vehicle upon which it is adapted to operate; the front axle 2, and rear axle 3, with rubber-tired wheels 4 and 5 respectively, being indicated diagrammatically together with the longitudinal frame-bar 6 and interposed springs 7 and 8.

In my improved mechanism independently operating lifting means are provided for the front and rear axles, consisting, as shown, of radius arms 10 and 11, which are pivotally mounted respectively upon the front and rear portions 12 and 13 of a connecting base; the spacing apart of said arms upon the base being variable to correspond with the wheel base of the vehicle to be operated upon, by means of an adjustable intermediate base portion 14 as indicated. The radius arms 11 are adapted to be swung into lowered horizontal position upon the base as shown in dotted lines in Fig. 1, and the front arms 10 may be similarly lowered to inoperative position, each pair of arms being swung independently of the other; so that the whole mechanism may either be folded into small compass for storage, or be placed flat for service without liability of any part thereof striking depending parts of the vehicle.

Both the front and rear lifts are preferably made up of a pair of radius arms as shown in Fig. 3; each pair being spaced apart laterally by a transverse pivot bar 15 which is fixed to the base 12, 13, and by a parallel bracing bar 16; and their lateral spacing on said bars being adjustable to best suit the vehicle or vehicles to which the mechanism is particularly adapted. The lowered arms 11, which I designate as the rear arms because they are preferably so located relative to the vehicle operated upon and its direction of movement as indicated, extend rearward from their pivotal connection to the base, when the mechanism is placed for operation, as shown, so that they may be readily swung upward to the forwardly inclined position indicated in Fig. 1, with the beveled axle-engaging ends 11ª thereof just to the rear of the axle 3 of the placed vehicle. In order to loosely support the freely swinging arms in proper operative position independently of contact with the axle, I provide a simple adjustable support consisting as shown of a pivoted prop 20, the free end of which rests upon the base.

The lifting power is applied to the front radius arms 10, as shown; the preferred means indicated being an ordinary jackscrew 25, the upper end 26 of which is pivotally connected to the transverse connecting bar 16 of the lifting arms, while the lower end thereof is     ated upon fixed step 27, preferably adjustably located on the base 12. The jack is removed from said fixed step in lowering the arms 10 to inoperative position as previously mentioned.

The spacing-apart of the front and rear radius-arm lifts being properly adjusted to the spacing of the axles on the vehicle, and the arms 11 being lowered to horizontal position as indicated in dotted lines Fig. 1, the vehicle may be readily positioned above the mechanism without striking any part of the latter; the front arms being ordinarily supported in the operative position indicated without objection, though readily lowered if desired, and there being no interfering connections whatever between the front and rear arms. The arms 11 being then swung into operative relation with the axle 3 as indicated in Fig. 1, the jack-screw 25 is simply operated to swing the arms 10 upward and rearward in an arc 28, thus raising the axle 2 and simultaneously moving the vehicle longitudinally so that the other axle 3 will be similarly raised by the corresponding swing of the arms 11 in their arc 29, until all the wheels are supported clear of the floor as desired; the vehicle itself thus serving as a connection between the front and rear lifts whereby they are jointly operated when in service, though they are normally movable independently. As soon as the front arms are lowered by a reverse operation sufficiently to support the vehicle upon the floor, the rear arms are left free to swing out of its path.

The preferred construction specifically described and shown may obviously be readily modified without departing from the essentials of the invention as defined in the claims.

What I claim is:—

1. An elevating mechanism for vehicles comprising radius-arm lifts for the front and rear axles respectively, and adjustable connecting means between said lifts, said front and rear lifts being arranged to swing independently, means for loosely supporting the lift for the rear axle in determined inclined position relative thereto, and a jack mechanism arranged to directly operate upon the other radius-arm lift substantially as set forth.

2. An elevating mechanism for vehicles comprising independently swinging radius-arm lifts for the front and rear axles, a longitudinally extensible connecting base upon which said lifts are pivotally mounted, means for loosely supporting the rear lift in determined inclined position on said base, a fixed stop on the front portion of said base, and a jack mechanism seated upon said stop and adapted to operatively engage the front lift, substantially as set forth.

3. An elevating mechanism for vehicles comprising a longitudinally extensible connecting base, independently swinging pairs of radius arms each pivotally mounted on said base and adjustably spaced-apart by a transverse connecting bar, means for loosely supporting the rear lift in determined inclined position on said base, an adjustably fixed step on the front portion of said base, and a jack mechanism seated on said step and engaging said transverse bar, substantially as set forth.

In testimony whereof, I affix my signature, in the presence of two witnesses.

FREDERIC WM. UNGER.

Witnesses:
D. M. STEWART,
W. G. STEWART.